Figure 1:
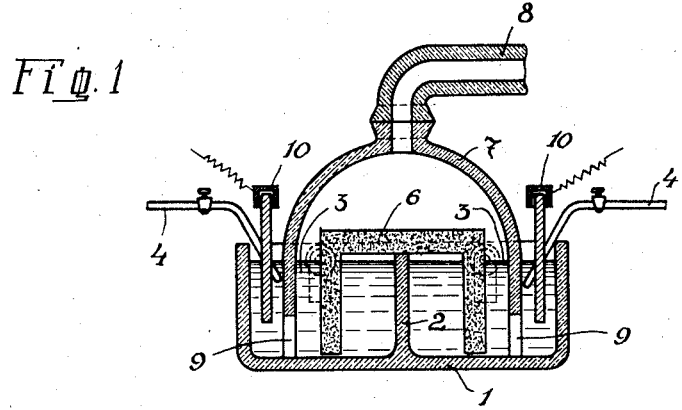

Sept. 25, 1928.

G. BAUM 1,685,210

APPARATUS FOR ELECTRICALLY HEATING LIQUIDS

Original Filed Oct. 15, 1925

Inventor
G. Baum,
by A. B. Foster
atty.

Patented Sept. 25, 1928.

1,685,210

UNITED STATES PATENT OFFICE.

GUSTAV BAUM, OF WEISSENSTEIN-ON-THE-DRAU, KARNTEN, AUSTRIA, ASSIGNOR TO THE NIAGARA ELECTRO CHEMICAL COMPANY, INC., OF NEW YORK, N. Y., A CORPORATION OF NEW YORK.

APPARATUS FOR ELECTRICALLY HEATING LIQUIDS.

Original application filed October 15, 1925, Serial No. 62,603, and in Austria October 28, 1924. Divided and this application filed October 19, 1926. Serial No. 142,582.

The present invention relates to an apparatus for electrically heating liquids, which heating may be effected for any purpose and particularly for that of distillation, concentration, provocation of chemical reactions and the like, the present application being a division of the copending application Serial No. 62,603/1925 filed October 15, 1925, which relates to the respective process.

In heating liquids by means of electrical energy and utilizing the liquid itself as resistance it is known to place between the electrodes insulating structures, which divide the liquid into streams thus increasing its resistance.

If the heating is to be carried out for the purpose of distillation or concentration or provocation of chemical reactions, the liquid undergoes in the course of its treatment continuous changes of its state and condition (temperature, chemical composition, degree of concentration etc.), owing to which alterations also its resistance changes. The present invention aims at rendering the apparatus adapted for automatically accommodating the resistance to such alterations occurring in the course of the treatment of the liquid. This is according to the invention constituting the subject matter of the above mentioned copending application obtained by employing structures of porous sucking material, which are plunged or dipped into the electrolyte for the purpose of sucking or absorbing therefrom the liquid to be treated.

According to the present invention for this purpose especially shaped bodies are employed having the form of rectangular frames, but with only three sides, the fourth side being left open. The two shanks or legs of this frame plunge or dip into the electrolyte contained in two separate chambers of the liquid receptacle, whilst the part connecting the two legs of the frame bridges over the cross-partition separating the said two chambers.

If the liquid is conducted by a sucking or absorbing action through structures of this kind, the graduation of the supply and of the division of the liquid according to the change of its state occurring therein during the treatment will be performed automatically, since the cross-section of the liquid diminishes with the distance from the liquid level.

The process admits of a great variety of applications. Organic and inorganic acids can be distilled and concentrated by its means, lyes can be concentrated and prepared for crystallization, solutions of all kinds can be reduced, mixtures of liquids separated and reactions (saponification for instance) carried out, whereby, in every instance, the highest possible theoretical output not only of material but also of thermic effect is nearly obtained. The process enables one likewise to effect the highest possible energy and heat concentration respectively.

Figure 2:
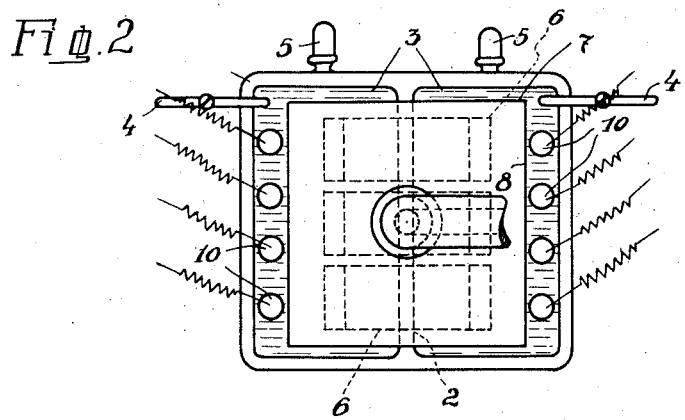
Figure 3:
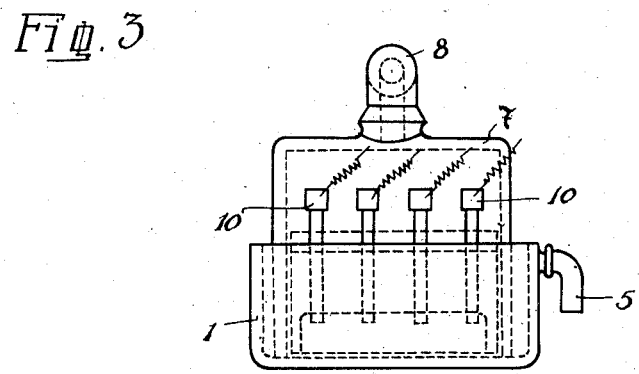

In the accompanying drawing by way of example one type of an apparatus working in accordance with the invention is illustrated, which apparatus may e. g. be employed for obtaining pure sulphuric acid from technical (commercial) sulphuric acid. Fig. 1 shows a longitudinal sectional elevation thereof, Fig. 2 the plan view and Fig. 3 an end view.

1 is a reservoir made of earthenware or of some similar material. The reservoir is divided by a cross-partition 2 into two chambers 3. Each chamber is provided with a feed pipe 4 and with a discharge pipe 5 by means of which the liquid is kept at the same level in both chambers.

The structure 6 made of porous material is shaped like a three sided open frame, the two sides of which dip into the electrolyte of the two chambers while the piece connecting the two sides of the frame bridges over the chambers and is above the level of the liquid.

A bell 7 is placed over the inner structure, which encloses the distillation chamber and is provided at the top with a discharge pipe 8 for the gases given out. The opening 9 in the body of the bell serve to render possible the communications between the electrolytes in the distillation chamber and the reservoir. The current is led in through the electrodes 10 which plunge outside the bell in the electrolytes of the two chambers 3.

The porous inner structures 6, which are made in sufficient number (in Figure 2, three of them are shown) raise the electrolytes by suction or absorption from the chambers 3 into the piece of the frame bridging over the chambers so that through this piece an electric connection between the two chambers is formed. The quantity of liquid present in the bridging piece decreases in the upward direction and the strength of the current and the heating increase to a corresponding amount in the same direction. At the culminating part of the bridge the heating reaches the distillation temperature and the vaporization therefore occurs at that part.

What I claim is:

1. An apparatus for heating liquids by electrical energy consisting of a liquid container made of insulating material, structures with small interstitial spaces dipping into the liquid in the container and extending above the liquid level, and means for leading electric current through the liquid contained in the structures.

2. An apparatus for heating liquids by electrical energy consisting of a liquid container made of insulating material, structures of highly porous material with small interstitial spaces dipping into the liquid in the container, and extending above the liquid level and means for introducing electric current through the liquid contained in the structures.

3. An apparatus for heating liquids by electrical energy consisting of a liquid container made of insulating material, structures with small interstitial spaces dipping into the liquid in the container and extending above the liquid level, a bell placed over the structures with an outlet-pipe, and means for conducting electric current through the liquid contained in the structures.

4. Apparatus for heating liquids by electrical energy, consisting of a liquid container made of insulating material, structures with small interstitial spaces having the form of three-sided frames, the legs of which dip into the liquid, and means for conducting electric current through the liquid contained in the structures.

5. Apparatus for heating liquids by electrical energy, consisting of a liquid container made of insulating material, structures with small interstitial spaces having the form of three-sided frames, the legs of which dip into the liquid, a bell placed over the structures with an outlet pipe and means for leading electric current through the liquid contained in the structures.

6. Apparatus for heating liquids by electrical energy, consisting of a liquid container made of insulating material and subdivided into chambers by cross-partitions, structures with small interstitial spaces having the form of three-sided frames with their legs dipping into the liquid of the chambers and means for leading the electric current through the liquid contained in the structures.

7. Apparatus for heating liquids by electrical energy, consisting of a liquid container made of insulating material and subdivided into chambers by cross-partitions, structures with small interstitial spaces having the form of three-sided frames with their legs dipping into the liquid of the chambers, a bell placed over the structures with an outlet pipe and means for leading the electric current through the liquid contained in the structures.

8. Apparatus for heating liquids by electrical energy, consisting of a liquid container made of insulating material and subdivided into chambers by cross-partitions, structures with small interstitial spaces having the form of three-sided frames with their legs dipping into the liquid of the chambers, a bell placed over the structures with an outlet pipe, and electrodes plunging into the liquid outside the bell.

9. An apparatus for heating liquids by electrical energy consisting of a liquid container made of insulating material, structures with small interstitial spaces dipping into the liquid of the container, a feed pipe and a discharge pipe, by means of which the liquid is kept at constant level and means for leading the electric current through the liquid contained in the structures.

In testimony whereof I have affixed my signature.

GUSTAV BAUM.